(12) United States Patent
Williams et al.

(10) Patent No.: US 7,280,087 B2
(45) Date of Patent: Oct. 9, 2007

(54) MULTIPLE BROWSER INTERFACE

(75) Inventors: Rodger Williams, Siler City, NC (US); Kenneth H. Gentry, Jr., Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 834 days.

(21) Appl. No.: 09/840,469

(22) Filed: Apr. 23, 2001

(65) Prior Publication Data
US 2002/0156835 A1    Oct. 24, 2002

(51) Int. Cl.
G09G 5/00    (2006.01)

(52) U.S. Cl. ............... 345/1.1; 345/2.1; 345/733; 345/740; 345/760; 345/771; 709/203; 700/239

(58) Field of Classification Search ........ 345/760, 345/733, 740, 771, 1.1, 211; 709/203
See application file for complete search history.

(56) References Cited

U.S. PATENT DOCUMENTS

| | | | |
|---|---|---|---|
| 4,352,961 A | 10/1982 | Kumada et al. ......... 179/110 A |
| 4,385,210 A | 5/1983 | Marguiss ............... 179/114 M |
| 4,857,887 A | 8/1989 | Iten .............................. 341/34 |
| 4,932,485 A | 6/1990 | Mori ....................... 177/25.15 |
| 4,984,445 A | 1/1991 | Ohuchi et al. ............... 72/360 |
| 5,170,195 A | 12/1992 | Akiyama et al. ............ 353/54 |
| 5,400,414 A | 3/1995 | Thiele ........................ 381/190 |
| D357,198 S | 4/1995 | Gatley ......................... D10/94 |
| 5,488,385 A | 1/1996 | Singhal et al. ................. 345/3 |
| 5,606,341 A | 2/1997 | Aguilera ..................... 345/87 |
| 5,647,151 A | 7/1997 | Fantone et al. .............. 40/454 |
| 5,665,938 A | 9/1997 | Boshear et al. ............. 174/50 |
| 5,694,141 A | 12/1997 | Chee ............................. 345/1 |
| 5,717,564 A | 2/1998 | Lindale ..................... 361/600 |
| 5,721,906 A * | 2/1998 | Siefert ........................... 707/9 |
| 5,748,269 A | 5/1998 | Harris et al. ................. 349/58 |
| 5,791,770 A | 8/1998 | Hoyt et al. ................. 362/294 |
| 5,828,768 A | 10/1998 | Eatwell et al. ............. 381/333 |
| 5,892,909 A * | 4/1999 | Grasso et al. .............. 709/201 |
| 5,961,289 A | 10/1999 | Lohmann .................... 416/189 |

(Continued)

FOREIGN PATENT DOCUMENTS

EP    1 143 388 A2    10/2001

(Continued)

OTHER PUBLICATIONS

IEEE Std 802.3ac-1998, Copyright 1998, IEEE, Inc., 345 East 47th St., NY, NY 10017-2394, ISBN 0-7381-1421-9 SH94675.*

(Continued)

*Primary Examiner*—Patrick Mackey
*Assistant Examiner*—Jeffrey A Shapiro
(74) *Attorney, Agent, or Firm*—Withrow & Terranova, PLLC

(57) ABSTRACT

The present invention provides a display controller driving multiple browser displays, which are associated with user input devices. Preferably, the display controller runs a browser application for each display and receives input from each user input device. Primary control for the browser applications is provided by a control application located remotely from the display controller. The user input is forwarded to the control application, which will process the user input and provide instructions to the corresponding browser application to request content from a web server application. The control application may also provide instructions unrelated to the user input to control any one or all of the browser applications.

26 Claims, 10 Drawing Sheets

U.S. PATENT DOCUMENTS

| | | | | |
|---|---|---|---|---|
| 5,980,090 | A | 11/1999 | Royal, Jr. et al. | 364/479.11 |
| 6,011,537 | A * | 1/2000 | Slotznick | 345/733 |
| 6,026,866 | A | 2/2000 | Nanaji | 141/59 |
| 6,052,629 | A | 4/2000 | Leatherman et al. | 700/241 |
| 6,104,451 | A | 8/2000 | Matsuoka et al. | 349/58 |
| 6,151,401 | A | 11/2000 | Annaratone | 381/388 |
| 6,176,421 | B1 | 1/2001 | Royal, Jr. et al. | 231/381 |
| 6,297,785 | B1 * | 10/2001 | Sommer et al. | 345/1.1 |
| 6,317,761 | B1 * | 11/2001 | Landsman et al. | 715/513 |
| 6,338,008 | B1 * | 1/2002 | Kohut et al. | 700/237 |
| 6,340,978 | B1 * | 1/2002 | Mindrum | 345/764 |
| 6,344,836 | B1 * | 2/2002 | Suzuki | 345/2.1 |
| 6,360,138 | B1 * | 3/2002 | Coppola et al. | 700/231 |
| 6,422,464 | B1 * | 7/2002 | Terranova | 235/384 |
| 6,427,032 | B1 * | 7/2002 | Irons et al. | 382/306 |
| 6,430,607 | B1 * | 8/2002 | Kavner | 709/217 |
| 6,442,448 | B1 * | 8/2002 | Finley et al. | 700/231 |
| 6,445,777 | B1 * | 9/2002 | Clark | 379/88.13 |
| 6,619,543 | B1 * | 9/2003 | Smith | 235/381 |
| 6,643,623 | B1 * | 11/2003 | Kolls | 705/14 |
| 6,757,723 | B1 * | 6/2004 | O'Toole et al. | 709/222 |
| 6,760,748 | B1 * | 7/2004 | Hakim | 709/204 |
| 6,763,376 | B1 * | 7/2004 | Devine et al. | 709/223 |
| 2001/0044843 | A1 * | 11/2001 | Bates et al. | |
| 2002/0099634 | A1 * | 7/2002 | Coutts et al. | |

FOREIGN PATENT DOCUMENTS

| | | |
|---|---|---|
| WO | WO 98/40826 | 9/1998 |

OTHER PUBLICATIONS

Microsoft Press Computer Ditionary, 3rd Ed., 1997, pp. 17, 374, 387, 495, 440 and 441.*

Microsoft Press, Computer Dictionary, 3rd Ed., 1997, pp. 374, 383, 505.* http://www.robertgraham.com/pubs/hacking-dict.html; copyright 1998-2001, pp. 138, 139.* http://www.pcwebopaedia.com/TERM/P/port.html; pp. 1-3.* http://www.webopedia.internet.com/quick_ref/portnumbers.asp; pp. 1-3.*

"Brushless DC Cross Flow Fan CFS Series".

"Driving Directions at Fuel Dispenser", Research Disclosure, Kenneth Mason Publications, No. 429, Jan. 2000, p. 136.

* cited by examiner

MULTIPLE BROWSER INTERFACE

FIELD OF THE INVENTION

The present invention relates to providing and controlling multiple browser interfaces from a single location, and in particular, providing such a system in a fueling environment.

BACKGROUND OF THE INVENTION

In recent years, traditional fuel dispensers have evolved into elaborate point-of-sale (PoS) devices having sophisticated control electronics and user interfaces with larger displays and easier-to-use user interfaces. The fuel dispensers may include various types of payment means, such as card readers and cash acceptors, to expedite and further enhance fueling transactions. Further, customers are not limited to the purchase of fuel at these dispensers. Newer dispensers allow the customer to purchase services, such as car washes, and goods, such as fast food or convenience store products. Once purchased, the customer needs only pick up the goods and services at the station store or the outlet of a vending machine.

In addition to local transactions, various types of information services are being provided at the fuel dispenser. In particular, Internet-related services are now being provided at the fuel dispenser. These services range from allowing customers to view various web pages to obtain desired information to supplying predefined advertising information to the customer via local or remote content servers. Additional information may be found in the following commonly assigned applications entitled INTERNET CAPABLE BROWSER DISPENSER ARCHITECTURE: U.S. Pat. No. 6,052,629, issued Apr. 18, 2000; U.S. Pat. No. 6,026,866, issued Feb. 22, 2000; Ser. No. 09/500,094, filed Feb. 8, 2000; Ser. No. 09/499,979, filed Feb. 8, 2000; and Ser. No. 09/828,050, filed Apr. 5, 2001, which are incorporated herein by reference in their entirety.

Unfortunately, the vast majority of fuel dispensers already in existence include displays and associated input devices that are insufficient for supporting web-based interaction. Further, many of the fuel dispensers fail to include the necessary control electronics to readily support such interaction.

Preferably, an interface supporting web browsing includes a large graphical display along with an intuitive and easy to use device to receive customer input. Most existing fuel dispensers and kiosks lack these features. Further, most are unable to provide web interaction without significant implementation costs associated with establishing the interface and providing content and control thereof. As such, there is a need for an efficient and economical way to provide web content and support web interaction at fuel dispensers or similarly situated kiosks.

SUMMARY OF THE INVENTION

The present invention provides a display controller driving multiple browser displays, which are associated with user input devices. Preferably, the display controller runs a browser application for each display and receives input from each user input device. Primary control for the browser applications is provided by a control application located remotely from the display controller. The user input is forwarded to the control application, which will process the user input and provide instructions to the corresponding browser application to request content from a web server application. The control application may also provide instructions unrelated to the user input to control any one or all of the browser applications.

The control application may run on a server communicating with the display controller using wireless or direct communications. The server may also run the web server application; however, content may be provided to the browser applications from any location or server. Further, the server may be configured to allow the control application to provide instructions or related information to a central control system, which is capable of controlling other peripherals and devices.

Preferably, the display controller and browser displays are mounted to a fuel dispenser or kiosk. The fuel dispenser or kiosk may include a control system and related peripherals, which may be controlled by the central control system. The control application is preferably configured to instruct the central control system to have the fuel dispenser or kiosk operate an associated peripheral. For example, a printer peripheral may be used to print coupons or other marketing indicia under the control of the control application. Web content may be provided to any one or all of the browser displays in coordination with printing the coupons or marketing indicia.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS FIGURES

The accompanying drawing figures incorporated in and forming a part of this specification illustrate several aspects of the invention, and together with the description serve to explain the principles of the invention.

Figure 8A:
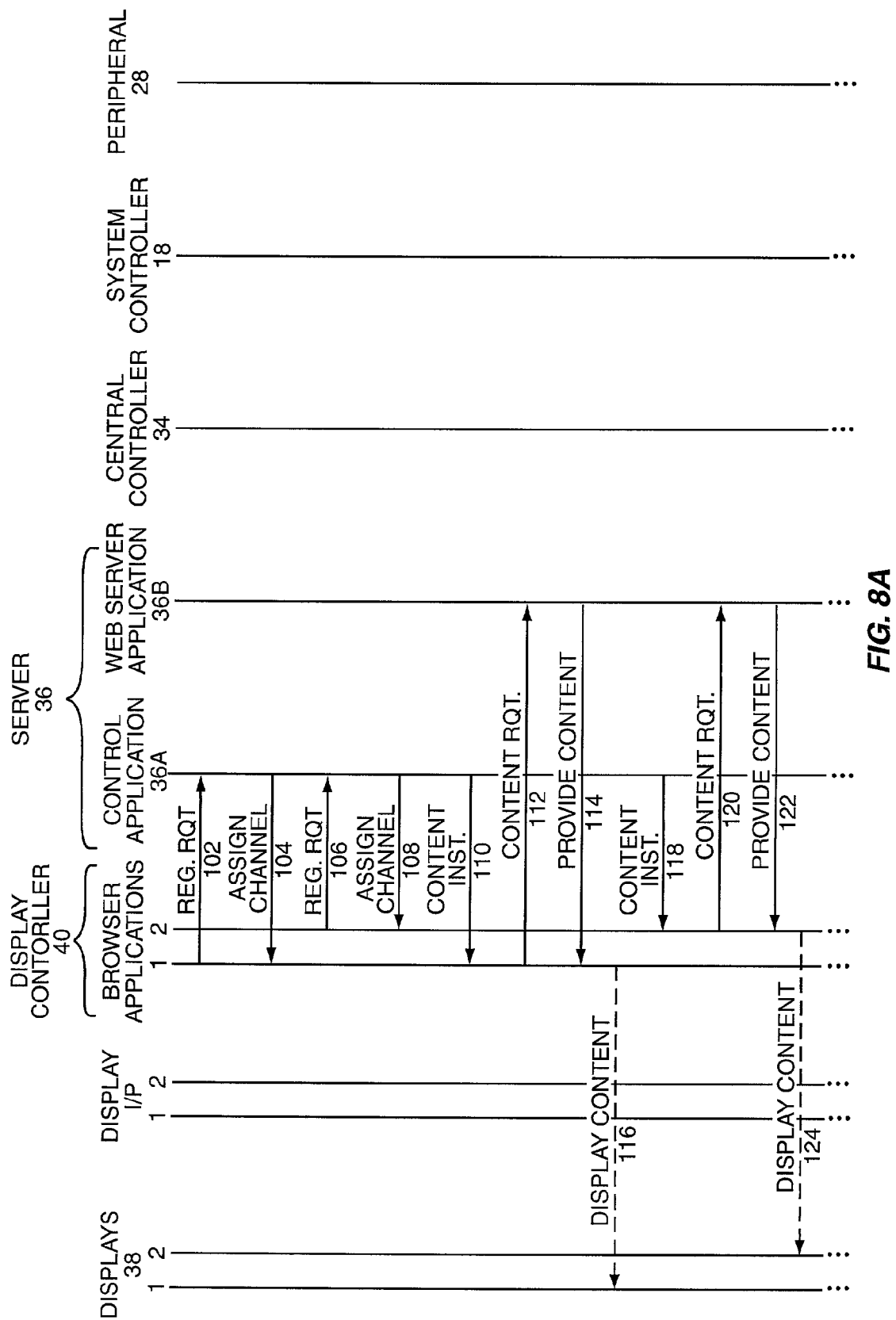
Figure 8B:
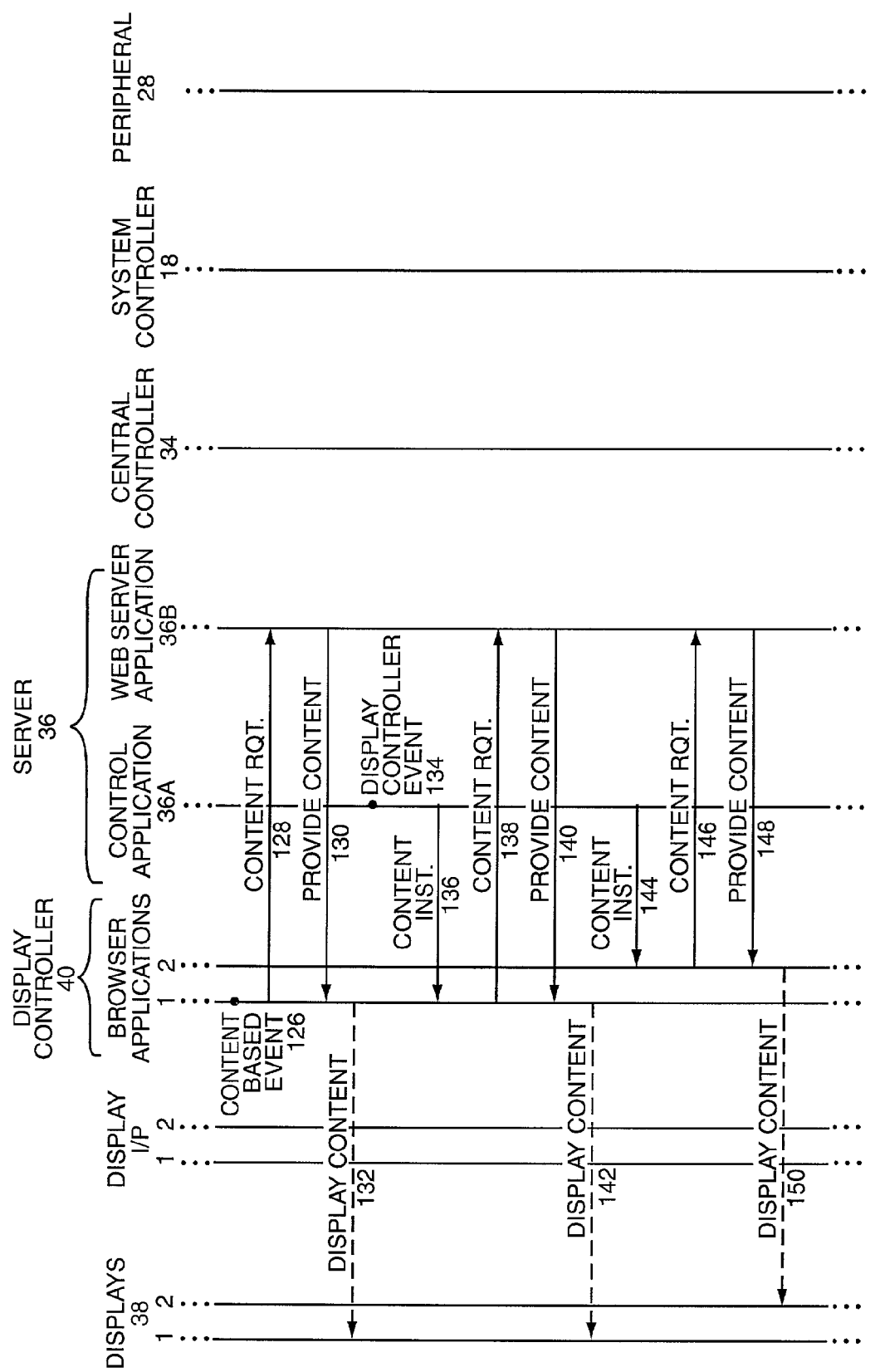
Figure 8C:
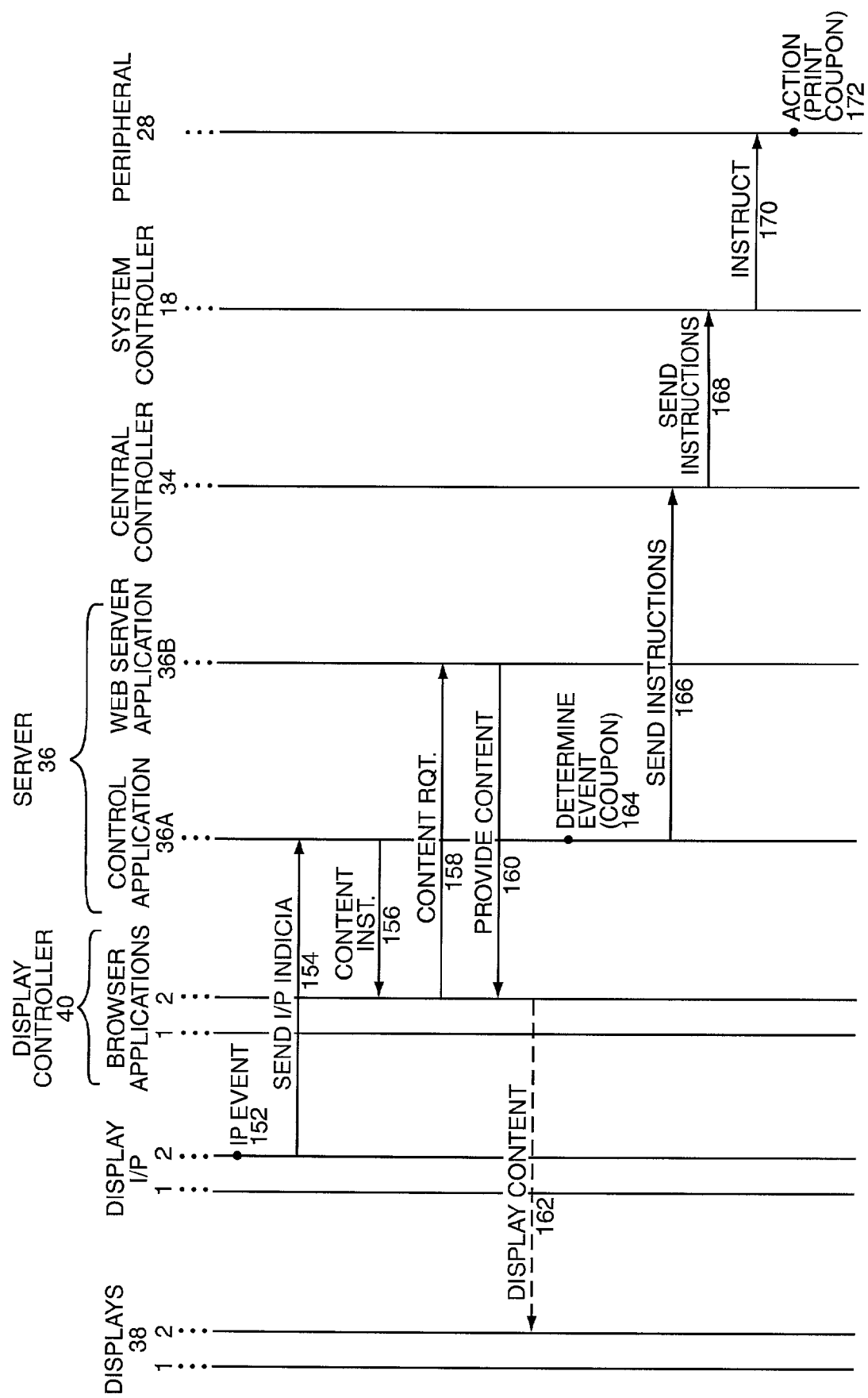

FIGS. 8A, 8B, and 8C provide a communication flow diagram outlining communication flow for various examples as provided for by the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
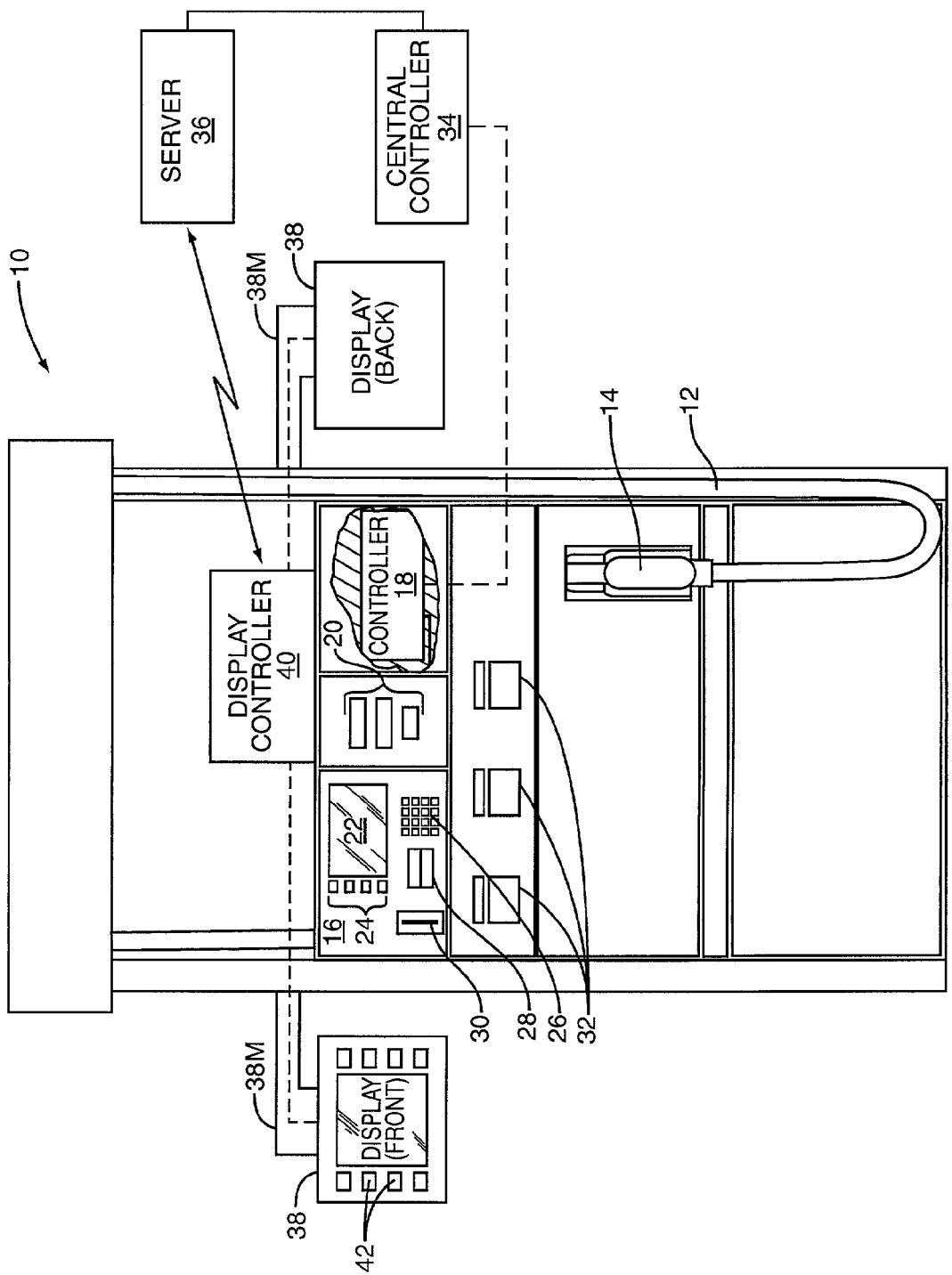
FIG. 1 illustrates a fuel dispenser configured according to a first embodiment of the present invention.

FIG. 1 illustrates a traditional fuel dispenser 10 updated to incorporate the concepts of the present invention according to a preferred embodiment. The fuel dispenser 10 will typically provide for fuel delivery from an underground storage tank to a customer's vehicle. Although not illustrated, the fuel delivery path will typically include a fuel delivery line having a metering device for measuring the amount of fuel delivered from the underground storage tank to the customer's vehicle. The fuel delivery path will also include a fuel delivery hose 12 and nozzle 14 for allowing the customer to control fuel delivery.

The fuel dispenser 10 will include a primary user interface 16 associated with a system controller 18, which will preferably control fuel delivery. The primary user interface 16 will typically include fueling transaction displays 20, which provide the price per gallon of fuel being dispensed, the quantity of fuel dispensed, and a total price for the fuel dispensed. Many fuel dispensers 10 also include a secondary display 22, which is larger than the fueling transaction displays 20, and is capable of providing additional information, under the control of the system controller 18, to the customer. The secondary display 22 may be a touch screen display or may include associated soft keys 24 to allow users to select associated options appearing on the secondary display 22. In addition to the soft keys 24, a keypad 26 may be provided on the primary user interface 16 to receive additional user input, such as a personal identification number (PIN), or the selection of a transaction type. Additionally, various peripherals 28 are supported by the controller 18, such as a printer for printing receipts, coupons, or other indicia desired to help facilitate a transaction or marketing efforts.

Preferably, a payment acceptor 30 is provided to allow customers to complete transactions carried out at the fuel dispenser 10. The payment acceptor 30 will typically take the form of a card reader or a cash acceptor. The card reader may be configured to read magnetic or optical indicia, such as magnetic strips or bar codes, respectively. Finally, additional buttons or keys 32 may be used to allow a customer to select a particular grade of fuel.

In the preferred embodiment of the present invention, the fuel dispenser 10 is associated with a central controller 34 located in a central location of the fueling environment remote from the fuel dispenser 10, such as in the fuel station store (not shown). The central controller 34 is typically electrically connected to the system controller 18 to support communications between the system controller 18 and the central controller 34. The central controller 34 typically takes the form of a central site controller and provides centralized point-of-sale (PoS) services and support for the fuel dispensers 10 in the fueling environment, as well as for other PoS systems within the fueling environment.

Preferably, local or remote servers 36 are configured to interact with one another via a local or wide area network, and are capable of controlling and providing web-based content for display on multiple browser displays 38, which are mounted on the fuel dispenser 10 using mounting brackets 38M. The browser displays 38 are preferably liquid crystal display (LCD) displays, but may incorporate any display technology, including cathode ray tube (CRT) displays.

According to the present invention, a display controller 40 acts as a liaison between the server 36 and the browser displays 38. Each browser display 38 is preferably associated with a user input device, such as soft keys 42 located about the periphery of the display area of the browser display 38. The browser display 38 may incorporate touch screen technology to implement the input device. Notably, any type of input device is acceptable, including pointers, microphones for voice recognition, and sensors to receive input from remote controls. The display controller 40 essentially runs browser applications for the respective browser displays 38 and ensures that requests for web content are associated with the proper browser display, if necessary, and directs web content to the proper browser display 38 upon receipt from the server 36.

The browser applications provided by the display controller 40 are typically configured as client programs using the hypertext transfer protocol (HTTP) to make requests of web servers, such as server 36, in traditional fashion. The server 36 typically runs a control application 36A (see FIG. 4) and a web server application 36A using the client-server model to control the display controller 40 and serve files that form web pages to the browser applications. HTTP is a set of rules for exchanging files, including text, graphic images, sound, video, and other multimedia files, over the Internet. Preferably, the HTTP application protocol cooperates with the TCP/IP suite of protocols to exchange information between the client-based browser applications and the server applications running on the server 36.

Typically, the server 36 contains, in addition to a markup language and other files to server, an HTTP daemon. The HTTP daemon is a program that is designed to wait for HTTP requests and process them when received. The browser application builds an HTTP request and sends the request to an Internet Protocol (IP) address indicated by a uniform resource locater (URL) provided to the browser or associated with a hypertext link. The HTTP daemon in the server 36 will receive the request, and, after any necessary processing, will return a requested file. Any markup languages are applicable, including the hypertext markup language (HTML), the extensible markup language (XML), and any subsets of the standard generalized markup language (SGML). Additional operational details are outlined below after reviewing the basic architecture of systems relating to the present invention.

Figure 2:
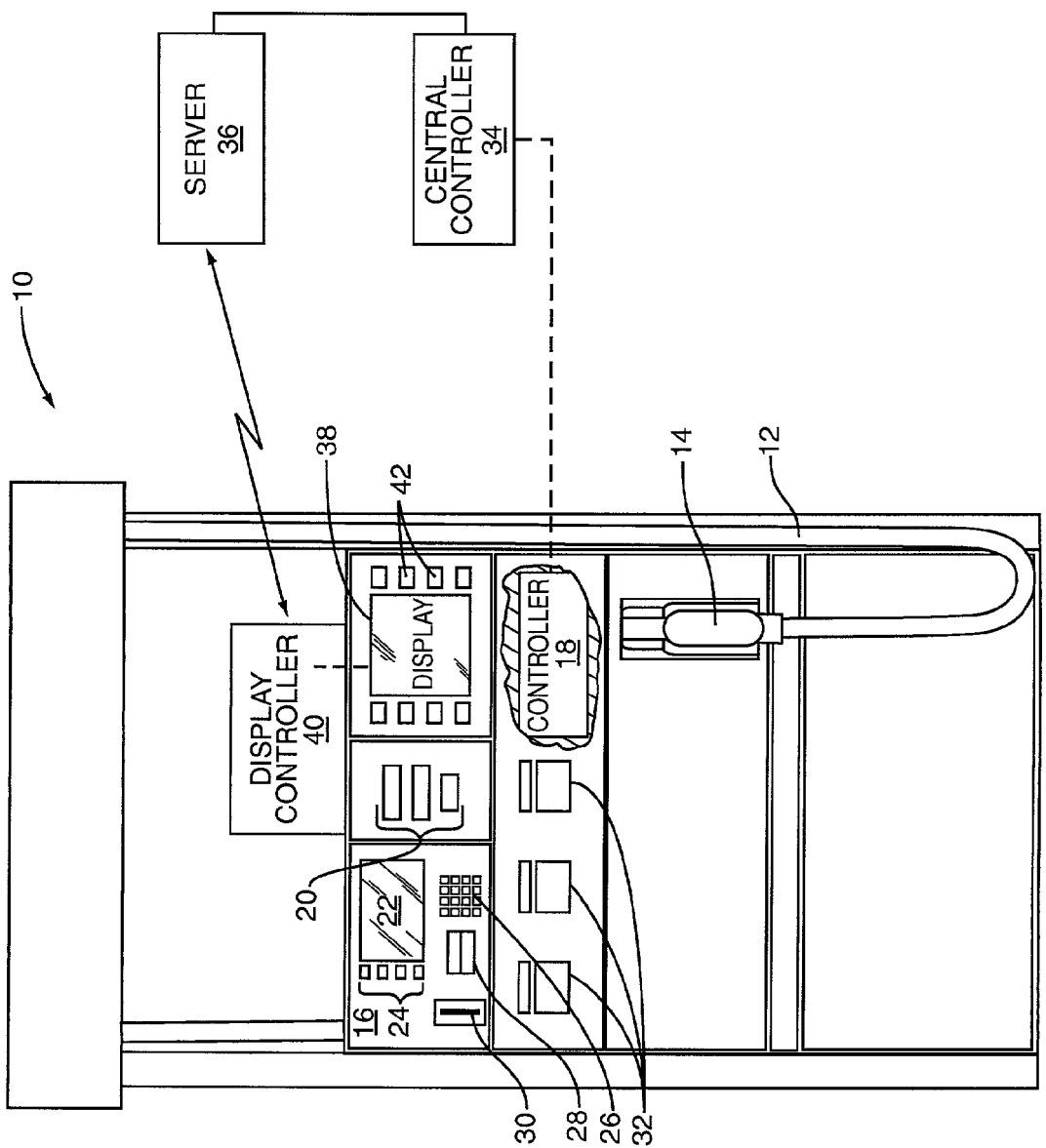
FIG. 2 illustrates a fuel dispenser configured according to a second embodiment of the present invention.
Figure 3:
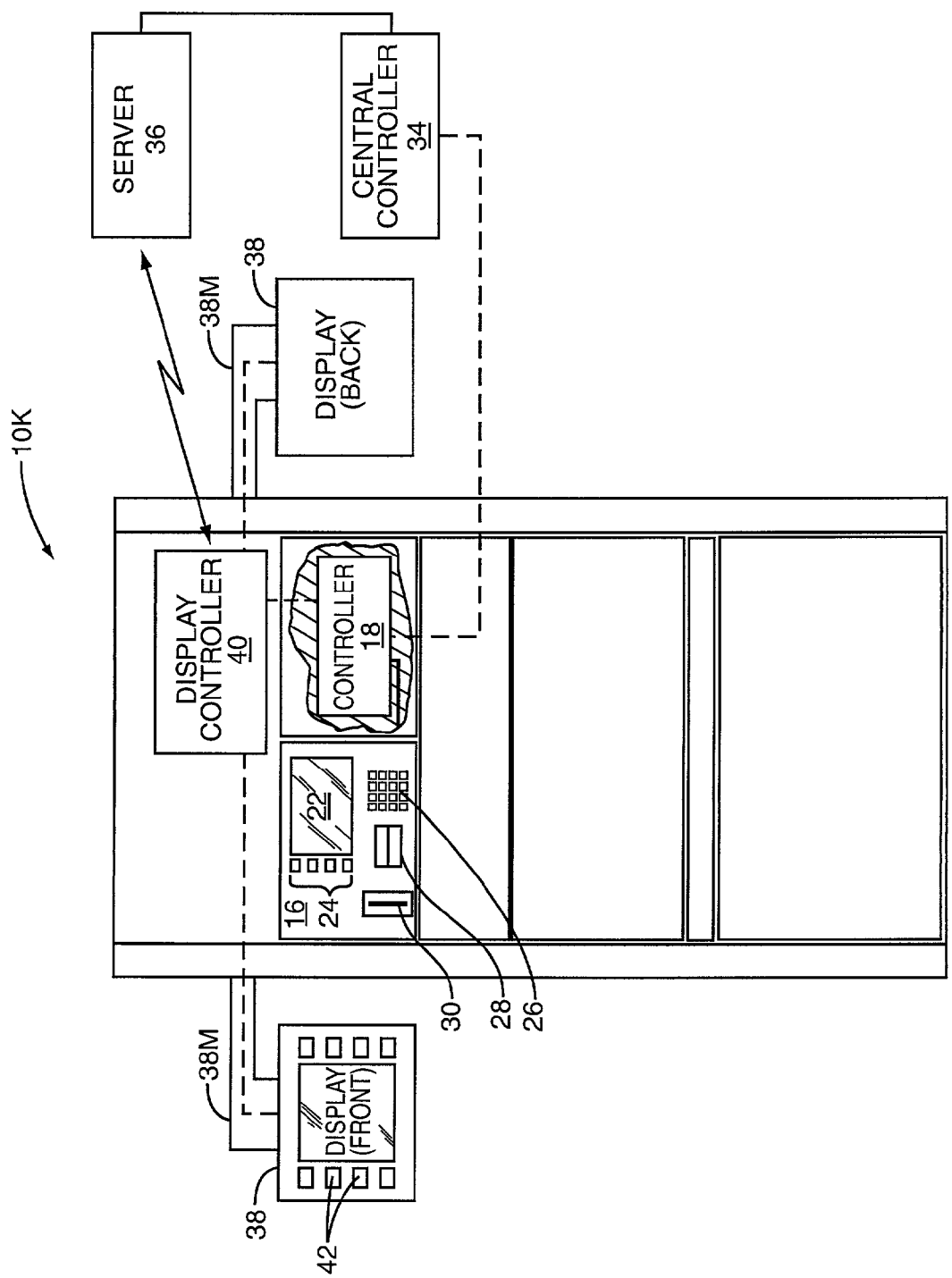
FIG. 3 illustrates a kiosk configured according to a third embodiment of the present invention.

FIG. 2 provides an alternative configuration according to the present invention. In this configuration, the browser displays 38 are incorporated in or on the primary user interface 16 instead of being mounted outside of the periphery of the fuel dispenser housing. FIG. 3 discloses another configuration of the present invention, wherein a kiosk 10K, such as an automated teller machine (ATM) or other information kiosk, incorporates the concepts of the present invention. Notably, the kiosk 10K would not include the fueling transaction displays 20, but may include a primary user interface 16 controlled by the system controller 18. The primary user interface 16 may also include a graphical display 22, soft keys 24, hard keys 26, a peripheral 28, such as a printer, and a payment acceptor 30, all of which are configured to operate in a similar fashion to that described above in association with the fuel dispenser 10.

The present invention is equally applicable to a fuel dispenser 10, a kiosk 10K, or other environment where it would be beneficial to have multiple browsers controlled from a single controller. Although the detailed description of the preferred embodiments describes the concepts of the invention in light of the preferred embodiment of a fuel dispenser 10, the operation of the present invention in other environments will be apparent to those of ordinary skill in the art in light of the discussion of the invention within a fueling environment.

Figure 4:
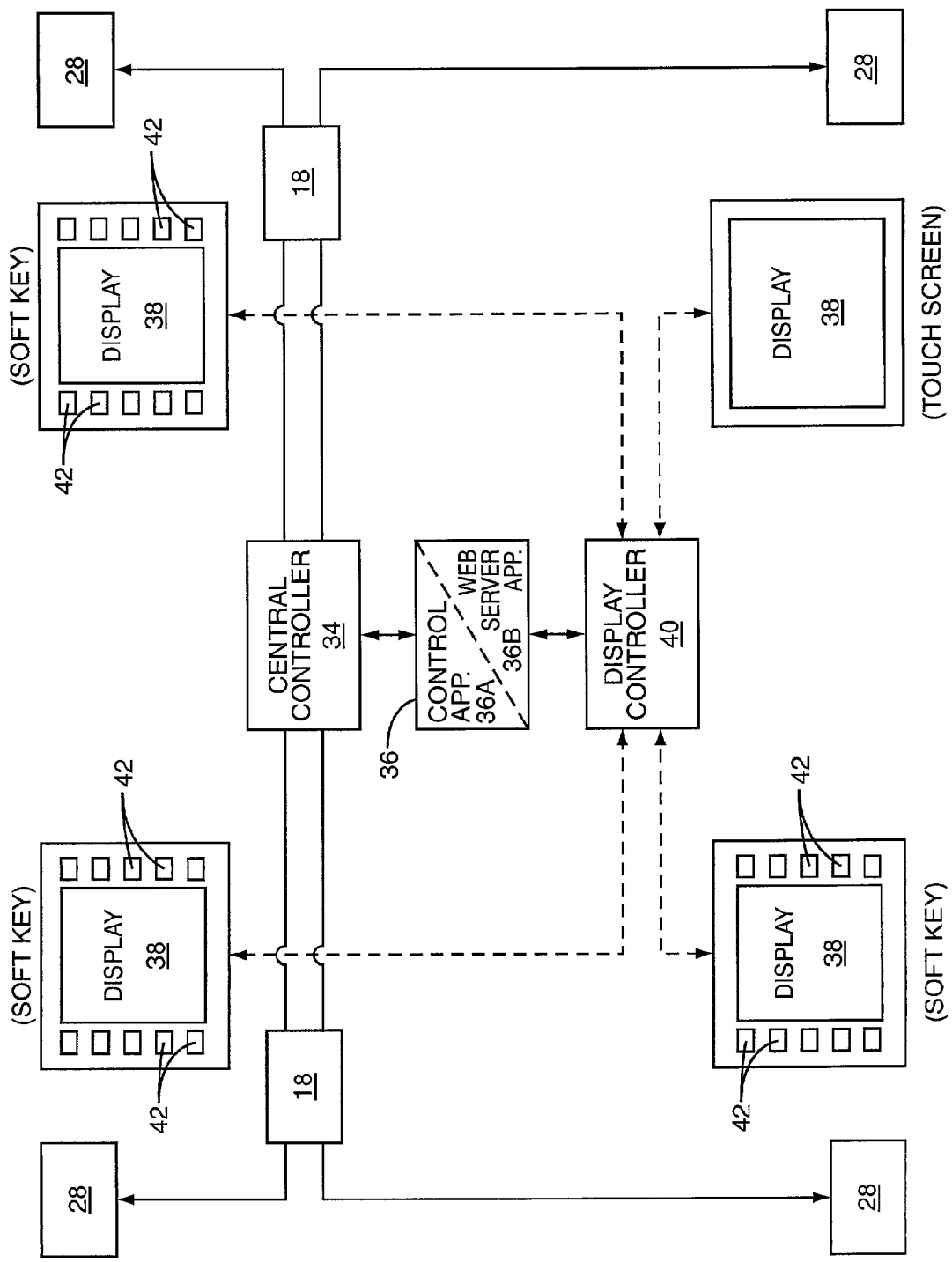
FIG. 4 is a block representation of a network architecture of the present invention.

FIG. 4 illustrates the relationship between the various systems of the present invention according to a preferred embodiment. As illustrated, the central controller 34 may control the peripheral 28 on the fuel dispenser 10, either directly or via the system controller 18. The peripheral 28 may be, for example, a printer capable of printing receipts, coupons, or other indicia sufficient to aid in completing a transaction or facilitating marketing efforts. The central controller 34 also communicates with the control application 36A running on server 36.

The control application 36A acts to control the content provided to the various browser displays 38 by instructing the browser application to request content from the web server application 36B or other web server. The content requests may be based on user input, defined instructions provided to the control application, or the actual content. For user input, the control application 36A will preferably process user input associated with the browser displays 38 and provide instructions to the appropriate browser application to request a select web page. Predefined instructions may trigger the control application 36A to instruct the appropriate browser application to request a select web page with or without regard to user input.

Preferably, the web server application 36B is configured to serve content including information or processes, such as JAVA applets, configured to determine what content the browser applications should display and when to display the content. For example, delivered content may include refresh instructions or instructions to request a different page after a select amount of time or after a predefined event. The content for the refreshed or new page will include further instructions to propagate continuous updating accordingly. Notably, the content may include instructions that are operable by the browser application or executable files capable of automatically executing on the display controller 40 to control the browser application or browser displays 38.

The control application 36A may instruct the browser application based on any type of indicia, including known customer preferences, time, date, dispenser or kiosk status, and the like. For example, depending on at what point a customer is with respect to the fueling transaction process, specific display content may be provided on one browser display 38, wherein on the opposite side of the fuel dispenser 10, preliminary advertisements and fueling instructions are provided to initiate a separate fueling transaction. Additionally, select control or the request for content may be provided to the browser display 38 based on customer input. For example, if a customer makes a request to see a select type of information, additional marketing information may be requested by the control application, wherein the web server application 36B will provide the information requested by the customer in addition to that requested by the display controller 40. Those skilled in the art will recognize the numerous and varying applications made possible by the present invention.

The control application 36A may interact with the central controller 34 to receive instructions as well as provide instructions for the central controller 34 and supported devices, such as the system controller 18 and peripheral 28. In the preferred embodiment, the communication link between the server 36 and display controller 40 is a wireless link; however, a direct electrical connection may be used. The wireless link may employ radio frequency, infrared, or other optical techniques. Preferably, wireless communications will incorporate the IEEE 802.11(b) communication standard. The display controller 40 will be able to recognize user input from each browser display 38 and determine the particular browser display 38 from which the input came. Similarly, content received from the server 36 may be directed to a particular browser display 38, all of the browser displays 38, or a select combination of the browser displays 38.

Figure 5:
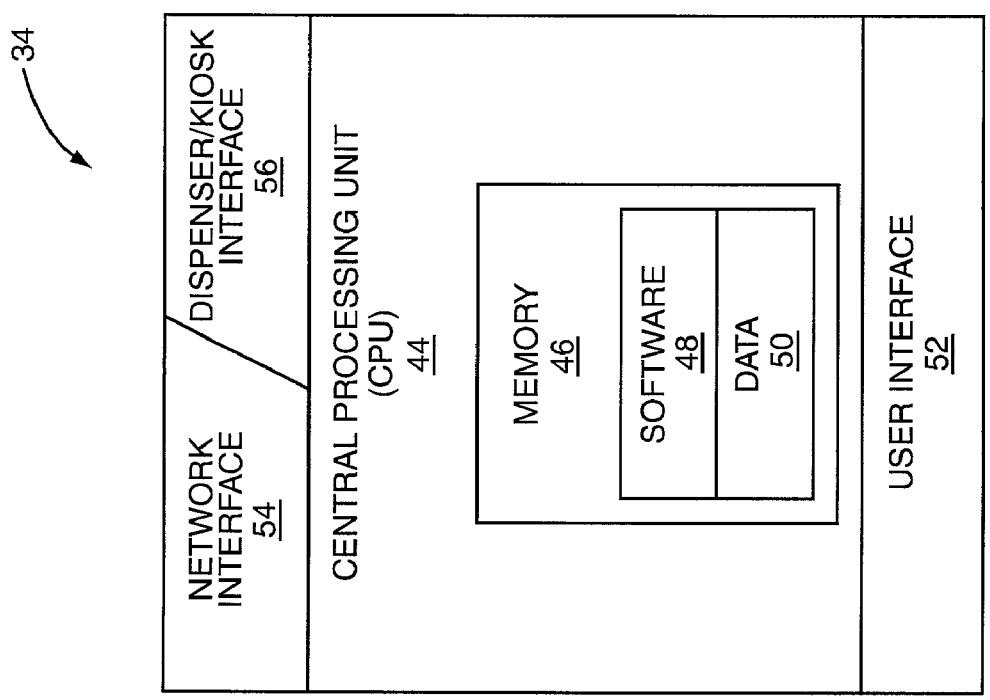
FIG. 5 is a block representation of a central controller according to the present invention.

Prior to outlining an operational flow, the basic architecture of each of the systems bearing on the present invention is described. FIG. 5 is a block representation of the central controller 34. The central controller 34 will include a central processing unit (CPU) 44 with memory 46 containing the requisite software 48 and data 50 required for operation. The CPU 44 will support a user interface 52, which may include a mouse, keyboard, display, card readers, transaction registers, or the like. Additionally, CPU 44 may include a network interface 54 to facilitate communications with the server 36, and a dispenser or kiosk interface 56 to facilitate communications with the fuel dispenser 10 or other kiosk 10K. Notably, the network interface 54 and dispenser or kiosk interface 56 may be replaced by one network interface, assuming that the server 36 and the fuel dispenser 10 are on or have access to a common network.

Figure 6:
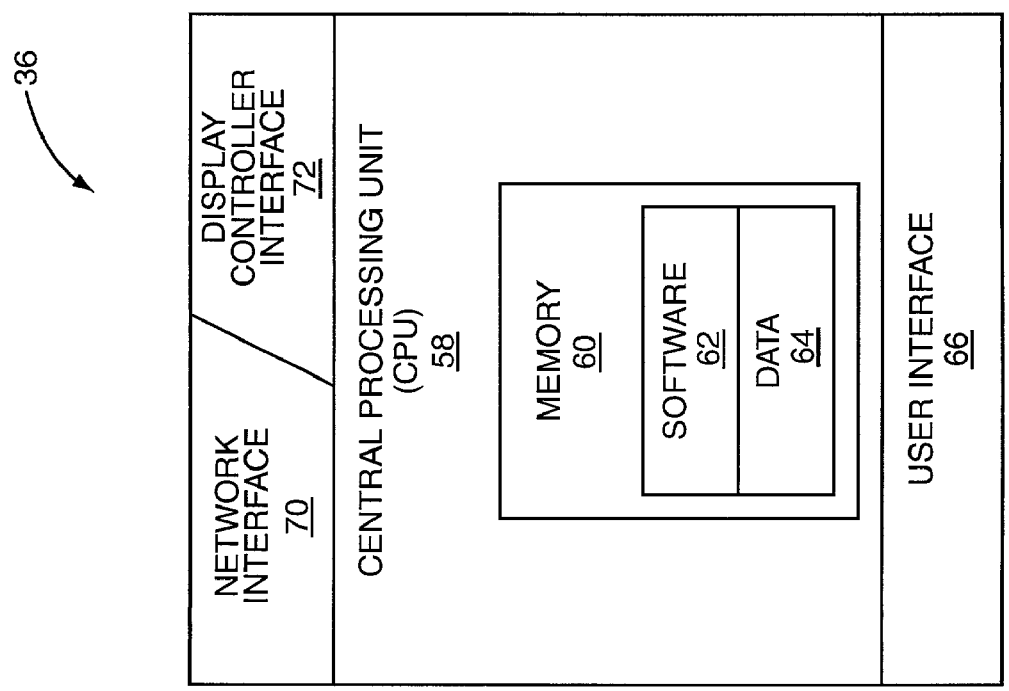
FIG. 6 is a block representation of a server according to the present invention.

A block representation of the server 36 is provided in FIG. 6. Server 36 is preferably a typical application and content server that has the additional capability of interacting with the central controller 34 and the display controller 40 according to the present invention. Server 36 will typically include a CPU 58 with sufficient memory 60 for software 62 and data 64 required for operation. The software 62 will include the control application 36A and, preferably, the web server application 36B. A user interface 66 is provided and will generally include a keyboard, mouse, and display. The server 36 will typically include a network interface 70 for interacting with the central controller 34, and a display controller interface 72 for communicating with the display controller 40.

The display controller interface 72 will preferably include the necessary communication electronics to facilitate wireless communications with the display controller 40. The wireless communication electronics will include the necessary receiver, transmitter, antenna, and processing circuitry to effectively process, modulate, and demodulate signals to transmit and signals received from the display controller 40. Like the central controller 34, the server 36 may integrate the network interface 70 and the display controller interface 72 into a common interface. The common interface may provide for wireless communications or direct electrical communications via a network.

Figure 7:
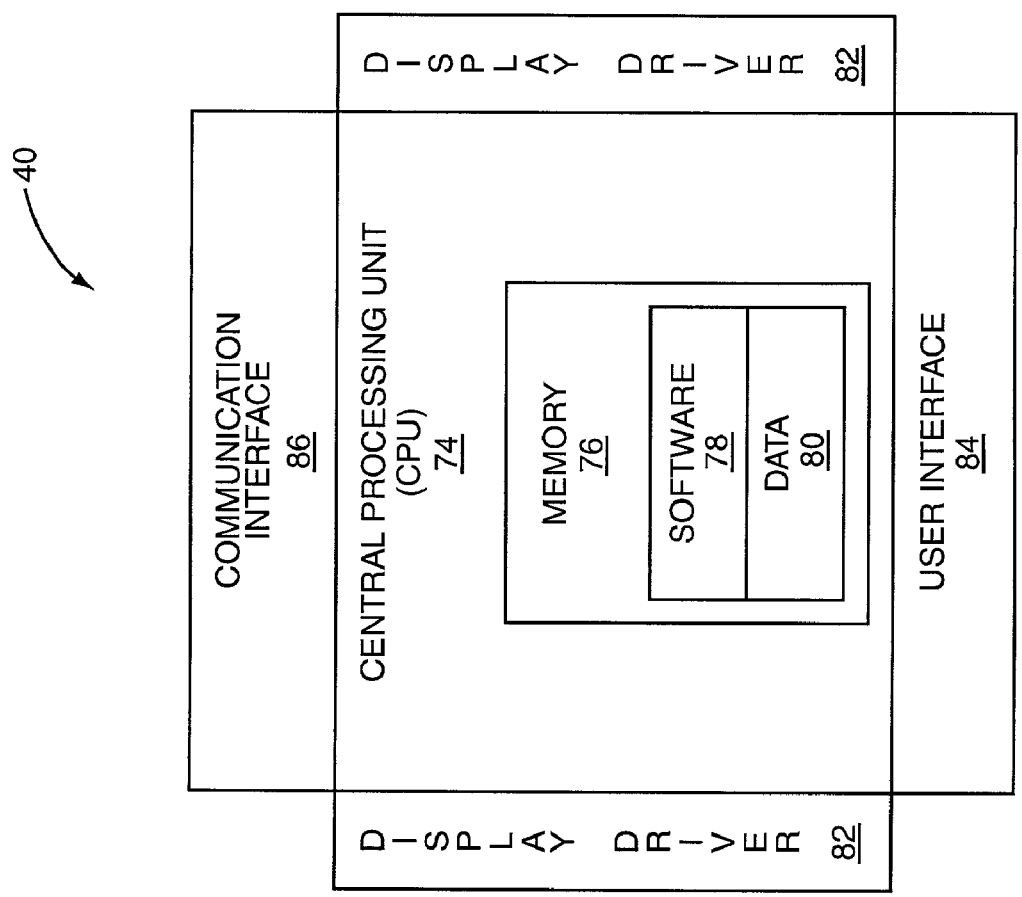
FIG. 7 is a block representation of a display controller according to the present invention.

The display controller 40 is illustrated in block form in FIG. 7. The display controller 40 will preferably include a CPU 74 including sufficient memory 76 for the software 78 and data 80 necessary for operation. Display drivers 82 are preferably provided in the display controller 40 for actually driving the browser displays 38. Those skilled in the art will recognize that the display drivers 82 may also be incorporated in the browser displays 38, wherein the display controller 40 simply provides display information to the display drivers 82 to effectively display the content on the browser displays 38.

The display controller 40 may include an optional user interface 84, which would preferably be used primarily for maintenance or configuration. Finally, a communication interface 86 complementary to the display controller interface 72 associated with the server is included to facilitate communications between the display controller 40 and the server 36. Again, communications may be wireless or may be facilitated through a direct connection.

In the preferred embodiment, the display controller 40 runs browser applications for each browser display 38 and communicates with the server 36 to interact with the control application 36A and web server application 36B. The browser applications are primarily controlled by the control application 36A to request content from the web server application 36B. User input associated with the browser display 38 is forwarded to the control application 36A to determine instructions for the corresponding browser application.

Preferably, each browser application communicates with input devices and other applications using three sockets or channels. The first socket is associated with the input device, such as soft keys 42. When a key (or the screen in a touch screen embodiment) is pressed, the browser will detect indicia of the input and forward the indicia to the control application 36A for processing. The second socket is used for communications with the control application 36A. The first and second sockets are usually static, and thus, are always active. The third socket is more dynamic and is used for communication between the browser application and the web server application 36B.

Reference is now made to FIGS. 8A, 8B, and 8C, which show a communication flow incorporating several exemplary scenarios. In the present example, the fuel dispenser 10 includes two browser displays 38 (1,2) associated with opposing fueling positions. Initially, each browser application running on the display controller 40 will register with the control application 36A by sending a registration request (steps 102 and 106). In response, the control application 36A will assign sockets or channels corresponding to the respective browser applications (steps 104 and 108). Preferably, these sockets correspond to different ports associated with a single IP address. Thus, when the web server application 36B sends web content, such as a web page, to a select port, the proper browser application receives the delivered content. During initialization, the browser applications need content to display on the respective browser displays 38. Preferably, the control application 36A will automatically instruct each of the browser applications to request certain content. The content may be the same or different depending on the application.

Assuming that there are two browser displays 38, the control application 36A will first send instructions to request content (content instructions) to the first and second browser applications (1,2) (steps 110 and 118). In turn, each browser application (1,2) will send a request (content request) to the web server application 36B according to the content instructions (steps 112 and 120) to download a select web page, file or the like. The web server application 36B will then provide the requested content to the corresponding browser applications (1,2) (steps 114 and 122). The browser applications will then display the content on the respective displays 38 (1,2) and operate according to any instructions provided in the content (steps 116 and 124). Further, any executable files provided with the content will run on the display controller.

At this point assume that the browser applications are operating as instructed by the content provide upon initialization. Further assume that the content provided to the first browser application (1) triggers a need to update the content initially provided with new content (step 126). For example, the initial content may have included instructions to refresh the initial content or request different content after a certain period of time or other event.

Thus, the first browser application (1) will request content by sending an appropriate request to the web server 36B (step 128), which will respond by providing the requested content to the first browser application (1) (step 130). The display content is then provided to the browser display 38 (1) by the browser application (1) (step 132). As with the initial content, new or updated content may provide further instructions or executable to drive the browser application.

As noted, the control application 36A may also trigger updates for any or all of the browser applications based on events unrelated to user input or content instructions. Upon occurrence of such an event (step 134), the control application 36A will first send instructions to request content (content instructions) to the first and second browser applications (1,2) (steps 136 and 144). In turn, each browser application (1,2) will send a request (content request) to the web server application 36B according to the content instructions (steps 138 and 146) to download a select web page, file or the like. The web server application 36B will then provide the requested content to the corresponding browser applications (1,2) (steps 140 and 148). The browser applications will then display the content on the respective displays 38 (1,2) and operate according to any instructions provided in the content (steps 142 and 150). As discussed above, any executable files provided with the content will run on the display controller.

A browser application may require updating upon receiving user input. Further, the user input or response thereto may required remote operations. For the next scenario, assume that a user provides input (step 152) at the second browser display (2) that requires a receipt to be printed with a coupon or other loyalty indicia at the peripheral 28 (e.g. printer) of fuel dispenser 10. As previously described, the input is directed to the control application 36A (step 154), which determines new content should be provided to the user via the browser display 38 (1) and that a coupon should be printed with a receipt at the corresponding fuel dispenser 10.

As such, the control application 36A provides instructions (content instructions) to the second browser application (2) to request select content from web server application 36B (step 156). As directed, the second browser application sends a content request to the web server application 36B (step 158), which responds by providing the requested content to the second browser application (2) (step 160). The second browser application (2) will then display the content as necessary on the browser display 38 (2) (step 162).

In the meantime, the control application 36A has determined that the coupon event occurred (step 164) and will send appropriate information or instructions to the central controller 34 (step 166). The central controller 34 will process the instructions, if and as necessary, and send instructions to the proper system controller 18 of the fuel dispenser 10 (step 168). The system controller 18 will instruct the peripheral 28, which is a printer in this example, to print a coupon or other loyalty indicia on the receipt (steps 170 and 172).

The above examples are intended to be illustrative of the various operations of the systems involved in the present invention upon the occurrence of different events at different locations. In essence, the display controller 40 may support various browser applications for displaying the respective content on multiple browser displays 38. Those skilled in the art will appreciate the efficiencies of implementing the control application 36A and web server application 36B in the server 36. Notably, the present invention may provide web content from any number of remote servers using a similar communications interface or by accessing these remote servers via the server 36 using known techniques.

In addition to supporting the traditional serving of web pages to the browser applications from any number of servers 36, the display controller 40 may provide additional services to further enhance customer interaction and the provision of information to the customer. Further, the display controller 40 may monitor customer input and cooperate with the server 36 or other systems in the environment to control the content displayed on the browser display 38 or control or provide information to other systems in the environment.

The present invention is particularly useful for retrofitting fuel dispensers 10 and kiosks 10K with multiple browser displays 38 capable of interacting with local or remote servers 36 to receive content. Those skilled in the art will recognize that numerous variations and implementations of the invention exist. Further, communications between the display controller 40 and the server 36 may be facilitated using a variety of equipment and communication techniques.

Notably, the communication interface, especially in wireless applications, for the server 36 will often be physically separate, wherein the display controller interface 72 will be associated with an antenna positioned to effectively transmit and receive information with a corresponding antenna associated with the communication interface 86 of the display controller 40. Similarly, the communication interface 86 may be physically separate from the display controller 40 to facilitate wireless communications.

Those skilled in the art will recognize improvements and modifications to the preferred embodiments of the present invention. All such improvements and modifications are considered within the scope of the concepts disclosed herein and the claims that follow.

What is claimed is:

1. A system for providing a multiple browser interface comprising:
    a) a plurality of displays with associated input devices; and
    b) a display controller associated with said plurality of displays, said display controller comprising:
        i) communication electronics for communicating with a server running a control application; and
        ii) a control system associated with said communication electronics and adapted to:
            1) run browser applications for each of said plurality of displays;
            2) receive input from each of said associated input devices and provide the input to the control application; and
            3) receive instructions for said browser applications from the control application; and
    wherein said display controller is further assigned one Internet Protocol (IP) address and each of the browser applications is assigned a unique port associated with the IP address.

2. The system of claim 1 wherein said plurality of displays and said display controller are mounted to a fuel dispenser.

3. The system of claim 2 wherein each of said plurality of displays is positioned to face opposing fueling positions.

4. The system of claim 1 wherein said plurality of displays and said display controller are mounted to a kiosk.

5. The system of claim 1 further comprising the server, wherein the server is remote from said display controller and adapted to run said control application.

6. The system of claim 5 wherein the server is further adapted to run a web server application configured to provide content to the browser applications of the display controller.

7. The system of claim 5 wherein said control application is adapted to process the input and provide certain of the instructions for a corresponding one of the browser applications.

8. The system of claim 5 wherein said control application is adapted to provide certain of the instructions for a corresponding one of the browser applications based on events or instructions unrelated to the input.

9. The system of claim 1 wherein, for each of said browser applications, said control system is further adapted to provide a request for content from a web server based on the instructions; receive the content in response to the request for content; and display the content on a corresponding one of said plurality of displays.

10. The system of claim 1 wherein said associated input devices include keys on at least one of said plurality of displays.

11. The system of claim 1 wherein said associated input devices include a touch screen configuration for at least one of said plurality of displays.

12. A system for providing a multiple browser interface comprising:
    a) a plurality of displays with associated input devices; and
    b) a display controller associated with said plurality of displays, said display controller comprising:
        i) communication electronics for communicating with a server running a control application; and
        ii) a control system associated with said communication electronicS and adapted to:
            1) run browser applications for each of said plurality of displays;
            2) receive input from each of said associated input devices and provide the input to the control application; and
            3) receive instructions for said browser applications from the control application;
    said display controller further assigned one Internet Protocol (IP) address and each of the browser applications is assigned a unique port associated with the IP address; and
    wherein said communication electronics are wireless communication electronics adapted to provide wireless communications with the server.

13. A method of supporting multiple browsers comprising:
    running browser applications for each of a plurality of displays associated with input devices at a first location with a single display controller;
    assigning one Internet Protocol (IP) address to the single display controller associated with the plurality of displays;
    assigning a unique port associated with the IP address to each of the browser applications;
    receiving input from each of the input devices;
    sending the input to a control application at a second location; and
    receiving instructions for said browser applications from the control application.

14. The method of claim 13 further comprising:
    a) providing a request for content from a web server based on the instructions;

b) receiving the content in response to the request for content; and c) displaying the content on a corresponding one of the plurality of displays.

15. The method of claim 13 further comprising running a web server application at the second location to provide content to the browser applications.

16. The method of claim 13 further comprising using the control application to process the input and provide certain of the instructions for a corresponding one of the browser applications.

17. The method of claim 13 further comprising using the control application to provide certain of the instructions for a corresponding one of the browser applications based on events or instructions unrelated to the input.

18. The method of claim 13 further comprising effecting control of a peripheral at the first location with instructions from the second location.

19. A system for supporting a multiple browser controller comprising:

a) communication electronics for communicating with the multiple browser controller; and b) a control system associated with said communication electronics and adapted to:

i) receive user input sent from the multiple browser controller having a unique Internet Protocol (IP) address; and ii) send instructions for browser applications running on the multiple browser controller based on the user input;

iii) receive a request from one of the browser applications corresponding to the instructions;

iv) send content to the multiple browser controller for display by the one of the browser applications, wherein the content sent to the multiple browser controller is addressed to a particular browser application by way of a unique port address associated with the unique IP address; and v) send a command to a printer peripheral associated with the particular browser application to print coupons.

20. The system of claim 19 wherein said control system is adapted to provide certain of the instructions for the one of the browser applications based on events or instructions unrelated to the input.

21. The system of claim 12 wherein said plurality of displays and said display controller are associated with a kiosk.

22. The system of claim 12 further comprising the server, wherein the server is remote from said display controller and is adapted to run said control application.

23. The system of claim 22 wherein the server is further adapted to run a web server application configured to provide content to the browser applications of the display controller.

24. The system of claim 22 wherein said control application is adapted to provide certain of the instructions for a corresponding one of the browser applications based on events or instructions unrelated to the input.

25. The system of claim 12 wherein, for each of said browser applications, said control system is further adapted to:

provide a request for content from a web server based on the instructions;

receive the content in response to the request for content; and display the content on a corresponding one of said plurality of displays.

26. The system of claim 12 wherein said input devices include keys on at least one of said plurality of displays.

* * * * *